United States Patent
Zhang (10) Patent No.: US 8,960,377 B2
(45) Date of Patent: Feb. 24, 2015

(54) NON-LINEAR SPRING ISOLATION DEVICE

(75) Inventor: Yu Zhang, Farmington, CT (US)

(73) Assignee: Otis Elevator Company, Farmington, CT (US)

( * ) Notice: Subject to any disclaimer, the term of this patent is extended or adjusted under 35 U.S.C. 154(b) by 1098 days.

(21) Appl. No.: 12/530,384

(22) PCT Filed: Mar. 29, 2007

(86) PCT No.: PCT/CN2007/001033
§ 371 (c)(1),
(2), (4) Date: Sep. 8, 2009

(87) PCT Pub. No.: WO2008/119202
PCT Pub. Date: Oct. 9, 2008

(65) Prior Publication Data
US 2010/0164151 A1    Jul. 1, 2010

(51) Int. Cl.
*B66B 7/08* (2006.01)
*B66B 7/10* (2006.01)
*F16F 7/14* (2006.01)
*B66B 7/04* (2006.01)

(52) U.S. Cl.
CPC . *B66B 7/08* (2013.01); *B66B 7/048* (2013.01); *F16F 7/14* (2013.01)
USPC .......................... 187/411; 187/412; 267/140.3

(58) Field of Classification Search
CPC ............ B66B 7/048; B66B 7/10; B66B 7/08; F16F 7/14
USPC .......... 267/140.13, 140.3; 187/401, 264, 411, 187/412
IPC ........................................ B66B 11/02
See application file for complete search history.

(56) References Cited

U.S. PATENT DOCUMENTS

| | | | |
|---|---|---|---|
| 5,564,530 A | 10/1996 | Iwakiri et al. | |
| 5,611,412 A * | 3/1997 | Yoo et al. ...................... | 187/412 |
| 5,750,945 A * | 5/1998 | Fuller et al. .................... | 187/292 |
| 5,862,888 A * | 1/1999 | Iwakiri et al. .................. | 187/345 |
| 6,315,084 B1 * | 11/2001 | Shon ............................... | 187/411 |
| 2006/0175152 A1 | 8/2006 | Fargo et al. | |

FOREIGN PATENT DOCUMENTS

| | | | | |
|---|---|---|---|---|
| JP | 55-57535 | | 10/1953 | |
| JP | 51137448 A | * | 11/1976 | ............. G01G 19/14 |
| JP | 03120188 A | * | 5/1991 | ................ B66B 7/08 |

(Continued)

OTHER PUBLICATIONS

JPO Patent & Utility Model Gazette Translation, JP,06-239570,A [Detailed Description], May 23, 2014, pp. 1-3.*

(Continued)

*Primary Examiner* — William A Rivera
*Assistant Examiner* — Stefan Kruer
(74) *Attorney, Agent, or Firm* — Cantor Colburn LLP (57) ABSTRACT

An elevator system includes a car assembly, a drive assembly, and a vibration-damping device (16) arranged at a connection between the top of the car assembly and the drive assembly. The vibration-damping device (16), which includes springs (32, 34, 36) that have varying spring stiffnesses and varying heights, is configured to provide a total spring stiffness between the top of the car assembly and the drive assembly. The total spring stiffness varies as a function of a mass of the car assembly.

44 Claims, 6 Drawing Sheets

(56) References Cited

FOREIGN PATENT DOCUMENTS

| JP | 6-23570 | 5/1994 |
| JP | 7-223785 A | 8/1995 |
| JP | 8-231154 | 9/1996 |
| JP | 2006056531 A | 3/2006 |
| JP | 2006-131339 | 5/2006 |
| JP | 2006131339 A | 5/2006 |
| JP | 2007231197 A | 9/2007 |

OTHER PUBLICATIONS

The English translation of the Office Action from the Japanese Patent Office for Japanese Patent Application No. 2009-552041.
International Search Report—PCT/CN2007/001033—Dated Jan. 17, 2008—11 pages.
The Japanese Office Action (translation) mailed Oct. 23, 2012.

* cited by examiner

NON-LINEAR SPRING ISOLATION DEVICE

BACKGROUND

This invention relates generally to elevator systems. More particularly, this invention relates to a device for damping the vertical vibration levels of an elevator car.

Elevator systems often include a car and a counterweight that move in opposite directions within a hoistway. A hoist machine moves the car in the hoistway via a traction machine connected between the hoist machine and the car. The traction machine includes connection members, such as ropes or belts, which are commonly looped around a sheave on the car and support the car and the counterweight for movement up and down the hoistway.

In elevator system design, the ride quality of the car is an important element of elevator system quality. Improving the ride quality of the car improves passenger comfort within the car. The elevator car noise level, horizontal vibration level, and vertical vibration level are often used in the elevator industry to describe the ride quality of the car. With regard to vertical vibration of the car, two methods are commonly employed to reduce vibration levels. One is to remove the source of the vertical vibration, and the other is to damp the vibration before it reaches the car, and thereby passengers riding in the car.

Prior vibration damping devices are well known in the art. For example, dampers arranged between the top of an elevator car assembly and a drive assembly commonly employ springs to improve the ride quality of the car. However, prior vibration dampers provide constant spring stiffness regardless of the load of the car, for example empty, half load or full load. In other words, prior dampers are linear. Because the vertical vibration level, and thereby the ride quality of the car, is a function of both spring stiffness and mass of the car, linear vibration dampers are disadvantageous for optimizing vibration damping capability for the varying car loads found in virtually every elevator system application.

In light of the foregoing, the present invention aims to resolve one or more of the aforementioned issues that afflict elevator systems.

SUMMARY

The present invention includes an elevator system comprising a car assembly, a drive assembly, and a vibration-damping device arranged at a connection between the top of the car assembly and the drive assembly. The vibration-damping device, which includes springs that have varying spring stiffnesses and varying heights, is configured to provide a total spring stiffness between the top of the car assembly and the drive assembly. The total spring stiffness varies as a function of a mass of the car assembly.

Embodiments of the present invention may also be adapted to a vibration-damping device including a first spring set and a second spring set arranged for compression at a connection between the top of an elevator car assembly and a drive assembly. The first spring set includes one or more springs each having a first stiffness and a first height. The second spring set includes one or more springs each having a second stiffness and a second height. The first height and the second height vary. The second stiffness and the first stiffness vary.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are hereafter briefly described.

DETAILED DESCRIPTION

Efforts have been made throughout the drawings to use the same or similar reference numerals for the same or like components.

Figure 1:
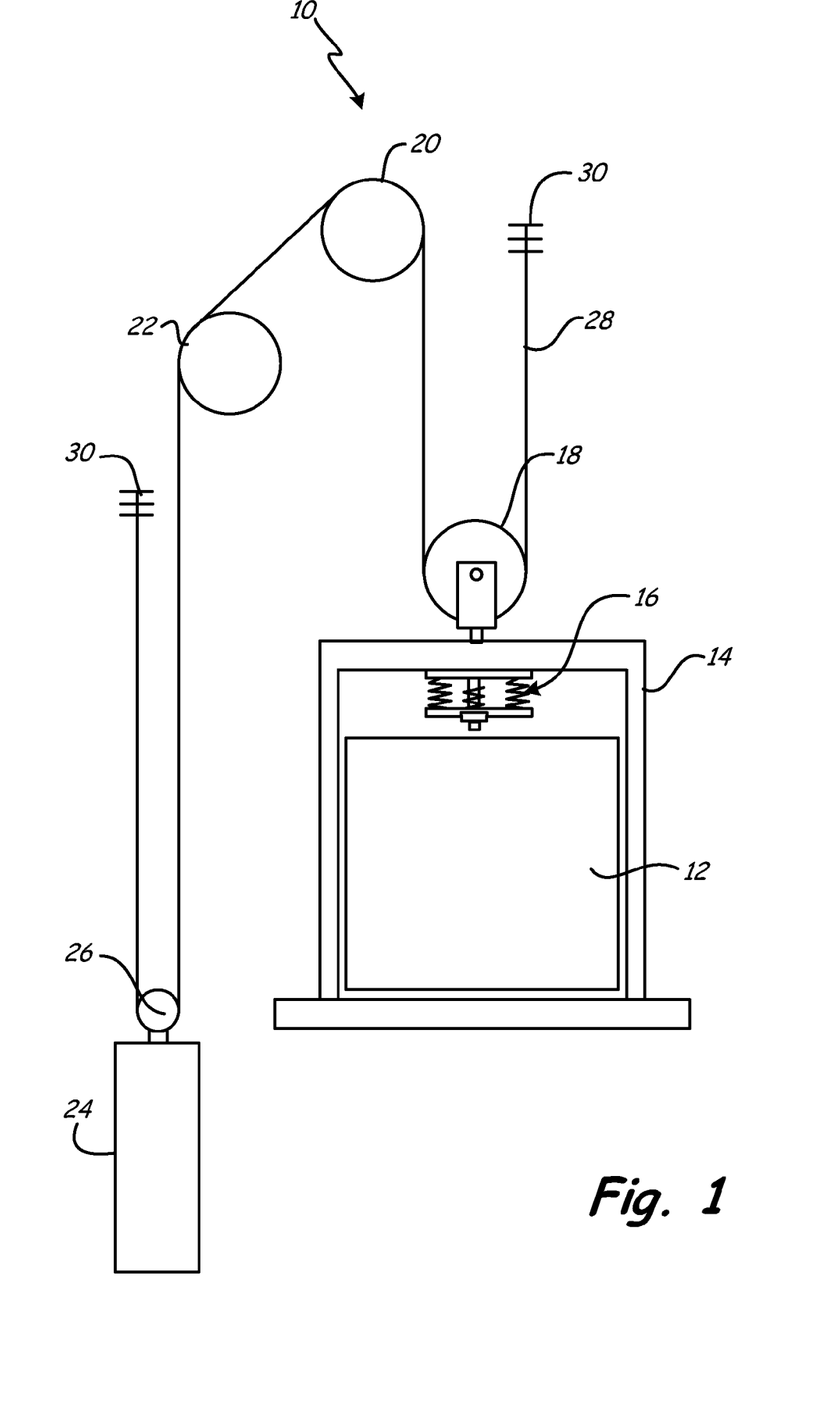
FIG. 1 is a schematic front view of an elevator system including a vibration-damping device according to an embodiment of the present invention.

FIG. 1 is a schematic front view of an elevator system 10 including a car 12, a car frame 14, a damper 16, a car sheave 18, a machine sheave 20, a deflector sheave 22, a counterweight 24, a counterweight sheave 26, a rope 28, and rope terminations 30. In FIG. 1, the car 12 is connected to the car frame 14. The car sheave 18 is connected to the top of the car frame 14, which connection includes the damper 16. The car 12, car frame 14, and car sheave 18 are connected to the machine sheave 20 by the rope 28, which loops under the car sheave 18 and is anchored at the termination 30 on one side and runs up to the machine sheave 20 on the other side. The rope 28 loops over the machine sheave 20 and runs to the deflector sheave 22. From the deflector sheave 22, the rope 28 connects the counterweight 24 to the machine sheave 20 (via the deflector sheave 22) by looping under the counterweight sheave 26 and up to the termination 30.

The elevator system 10 shown in FIG. 1 includes a 2:1 roping arrangement between the car frame 14 and the counterweight 24. However, damping devices according to the present invention may be used in elevator systems including alternative roping arrangements. For example, an elevator system including the damper 16 connected between the top of the car frame 14 and the car sheave 18 may be configured with a 1:1 roping arrangement in which the rope 28 starts at the top of the car 12, passes over the machine sheave 20 to the deflector sheave 22, and terminates at the top of the counterweight 24.

In FIG. 1, as the machine sheave 20 turns clockwise, the car 12 and the car frame 14 travel down and the counterweight 24 travels up. As the machine sheave 20 turns counter-clockwise, the car 12 and the car frame 14 travel up and the counterweight 24 travels down. The counterweight 24 commonly weighs about the same as the car 12 and the car frame 14 when the car 12 experiences an average load, for example, 40 percent of capacity. In instances in which the car experiences an average load, the counterweight 24 balances the weight of the car 12 and the car frame 14 about the machine sheave 20. Balancing the car 12 and the car frame 14 with the counterweight 24 conserves energy by reducing the force needed from the machine sheave 20 to move the car 12 and the car frame 14 up and down.

In the elevator system 10 shown in FIG. 1, the car 12 and the car frame 14 may experience vertical vibrations created by various environmental or system sources. For example, the car 12 and the car frame 14 may be guided up and down a hoistway by one or more guide rails. Guide rails are commonly slightly deflected along their length in the hoistway and discontinuous at segment joints, both of which may create vibrations that can travel to the car frame 14 and to the car 12. The damper 16 is configured to absorb vertical vibrations propagating through the system 10 to the top of the car frame 14 and the car 12 through two sets of springs. The damper 16 improves damping capability, and thereby improves the ride quality of the car 12, by varying total stiffness as a function of the load of the car 12 (and the car frame 14).

Figure 2:
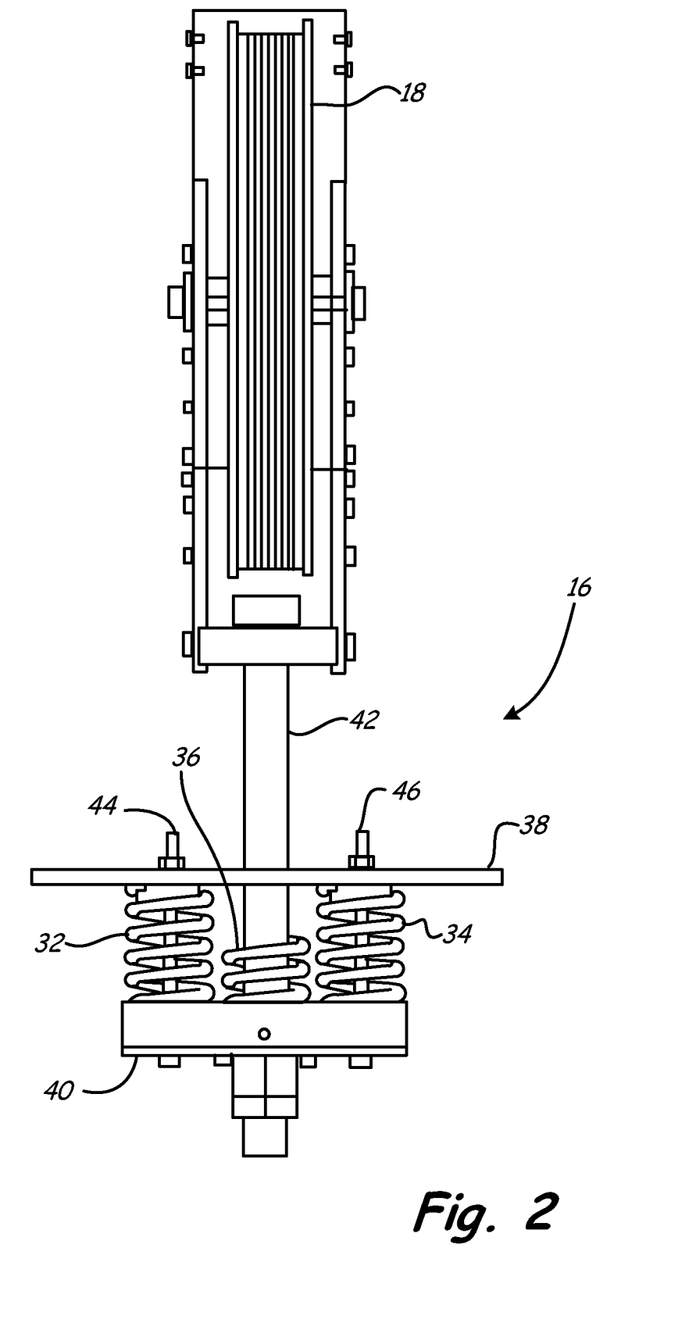
FIG. 2 is a front view of the vibration-damping device shown in FIG. 1.
Figure 3:
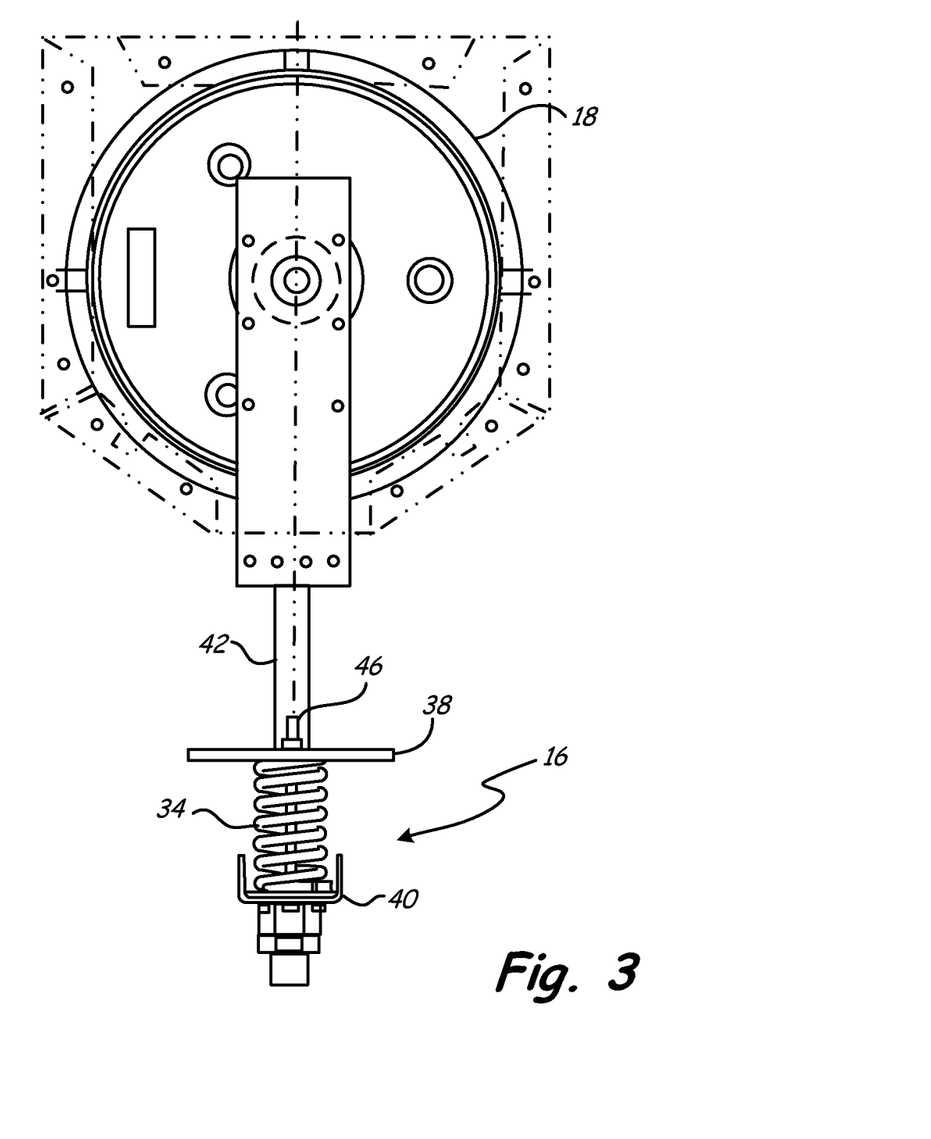
FIG. 3 is a side view of the vibration-damping device shown in FIG. 1.

FIGS. 2 and 3 show front and side views, respectively, of the damper 16 shown in FIG. 1. The damper 16 shown in FIGS. 2 and 3 includes a first spring 32, a second spring 34, a third spring 36, a top plate 38, a bottom plate 40, a sheave rod 42, and first and second spring guides 44, 46. The first, second, and third springs 32, 34, 36 may be arranged between the top and bottom plates 38, 40. The first and second spring guides 44, 46, may be configured to hold the first and second springs 32, 34 in position between the top and bottom plates 38, 40. The third spring 36 may be arranged around and held in position by the sheave rod 42. As the embodiment in FIGS. 2 and 3 shows, the height of the first and second springs 32, 34 may be greater than the height of the third spring 36. Additionally, a shim may be arranged on top of the bottom plate 40 and under the bottom of the third spring 36 to adjust the distance between the top plate 38 and the top of the third spring 36. The top plate 38 is attached to the car frame 14 as shown in FIG. 1. The sheave rod 42 may be configured to connect the first spring 32, the second spring 34, the third spring 36, the top plate 38, the bottom plate 40, and the first and second spring guides 44, 46 to the car sheave 18. The sheave rod 42 may be attached to the bottom plate 40 and slidably connected to the top plate 38, such that the sheave rod 42 is free to move up and down relative to the top plate 38 and the top plate 38 is free to move up and down relative to the sheave rod 42. As the damper 16 shown in FIGS. 2 and 3 experiences loads, the top and bottom plates 38, 40 are forced together and the springs 32, 34, 36 are successively compressed.

Figure 4:
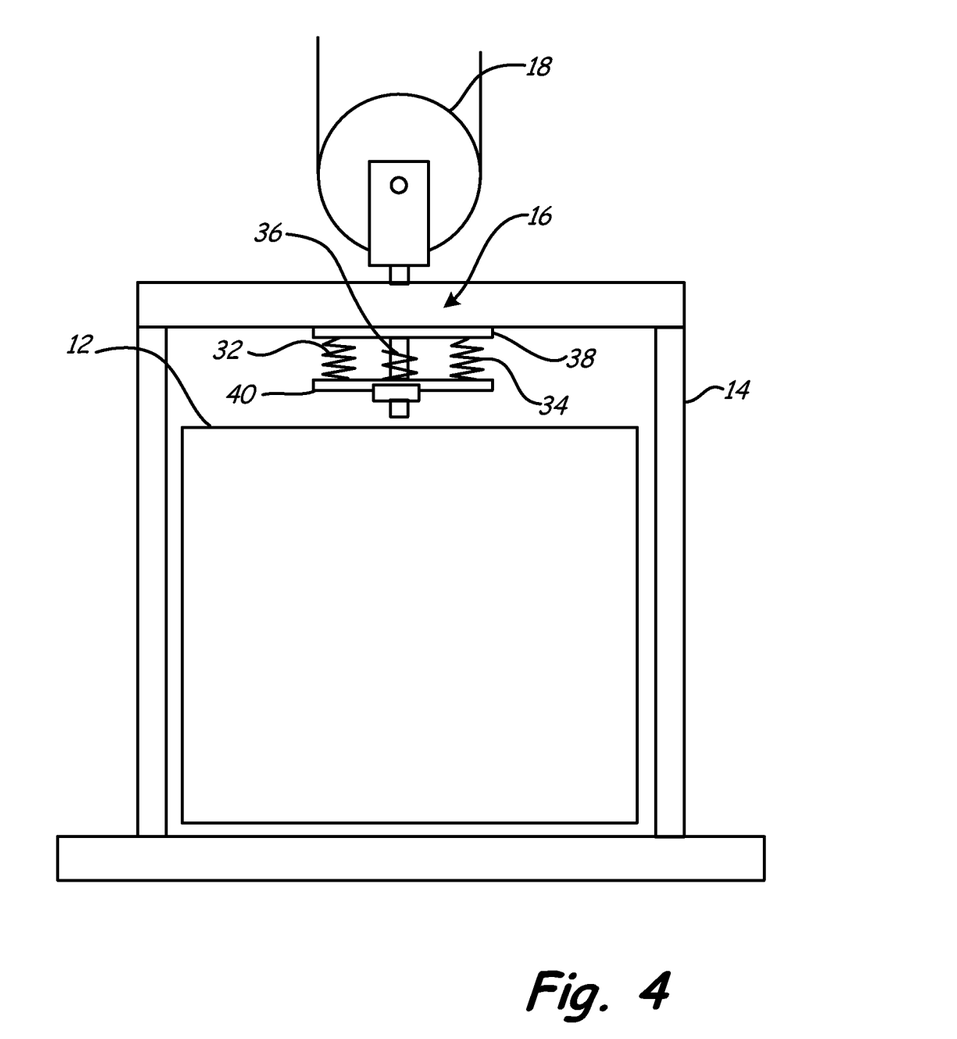
FIG. 4 is a schematic partial view of the elevator system shown in FIG. 1 with an empty elevator car.
Figure 5:
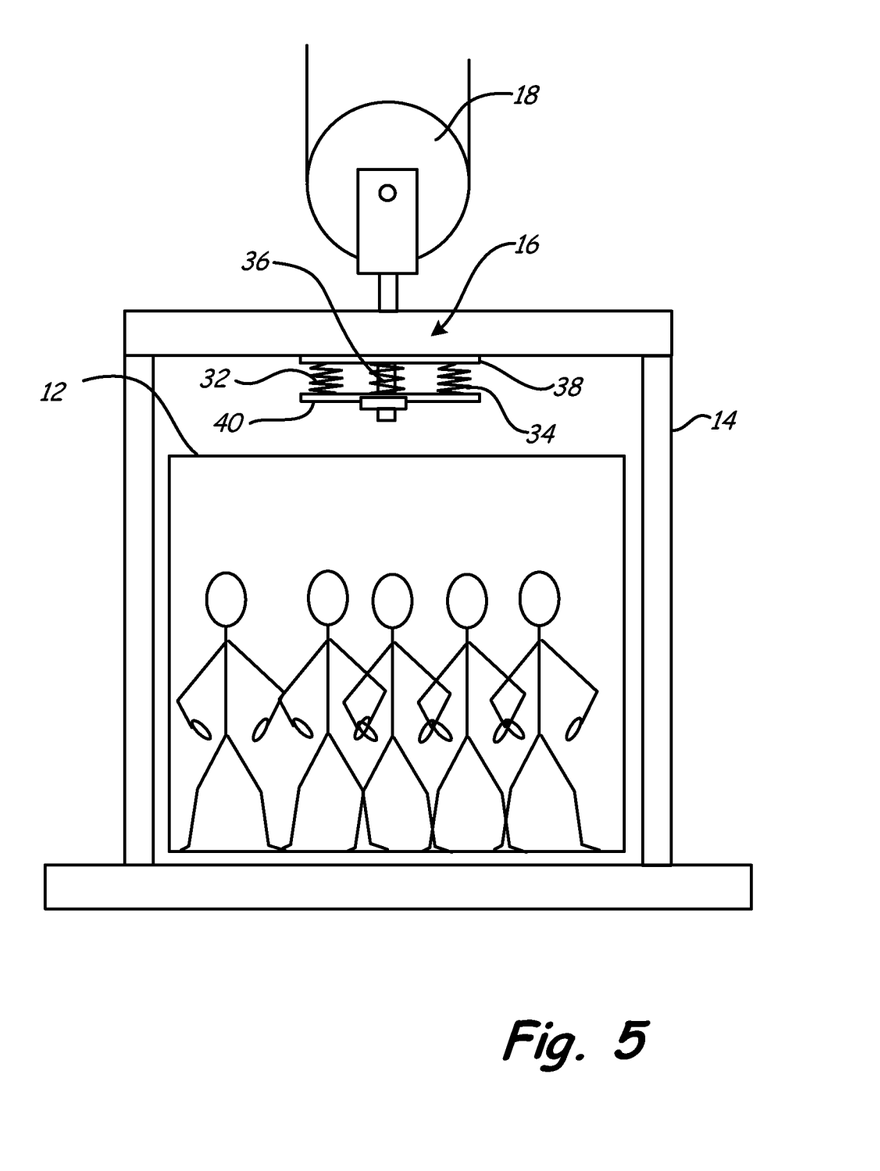
FIG. 5 is a schematic partial view of the elevator system shown in FIG. 1 with an elevator car loaded with passengers.

The damper 16 improves damping capacity by varying total stiffness as a function of the load of the car 12 (and the car frame 14). FIGS. 4 and 5 illustrate the damper 16 under different loads as the weight of the car 12 and the car frame 14 changes during elevator operation. FIGS. 4 and 5 are schematic partial views of the elevator system 10 shown in FIG. 1 including the car 12, the car frame 14, the damper 16, and the car sheave 18. The damper 16 includes the first spring 32, the second spring 34, the third spring 36, the top plate 38, and the bottom plate 40. The car 12 is connected to the car frame 14. The damper 16 may be arranged at the connection between the car frame 14 and the car sheave 18. In FIG. 4, the car 12 is empty and the load on the damper 16 partially compresses the first and second springs 32, 34 between the top and bottom plates 38, 40, but does not compress the third spring 36. In FIG. 5, the car 12 is loaded with passengers and the load on the damper 16 further compresses the first and second springs 32, 34 and additionally compresses the third spring 36 between the top and bottom plates 38, 40. As illustrated in FIGS. 4 and 5, the damper 16 may be configured to vary total stiffness as a function of the load on the car 12 from the sum of the stiffnesses of the first and second springs 32, 34 in FIG. 4 to the sum of the stiffnesses of the first, second, and third springs 32, 34, 36 in FIG. 5.

Although the damper 16 shown in FIGS. 1-5 includes three cylindrical springs 32, 34, 36, the exact number, shape, type, stiffness, and arrangement of the springs used in embodiments of the present invention is not limited to this configuration. For example, another embodiment of a damper may include four cylindrical springs arranged in a row for compression between two plates where two of the four springs are longer and have stiffnesses less than the other two springs.

Dampers according to the present invention may include two characteristics, which act to vary total stiffness as a function of the load of the elevator car. First, a damper may be configured with multiple springs, or groups of springs, which are arranged to successively compress as loads on the springs increase. In such embodiments, the total stiffness cumulates as the springs, or groups of springs are successively compressed. For example, the total stiffness of the damper 16 shown in FIGS. 4 and 5 increases as the load on the car 12 increases from the sum of the stiffnesses of the first and second springs 32, 34 in FIG. 4 to the sum of the stiffnesses of the first, second, and third springs 32, 34, 36 in FIG. 5. Second, a damper according to the present invention may be configured with individual springs, or groups of springs, whose stiffnesses vary with respect to each other. For example, the damper 16 shown in FIGS. 4 and 5 may be configured with first and second springs 32, 34 each with a first stiffness and a third spring 36 with a second stiffness. Further, the first stiffness of the first and second springs 32, 34 and the second stiffness of the third spring 36 may vary, i.e., the second spring stiffness of the third spring 36 may be less than, equal to, or greater than the first spring stiffness of the first and second springs 32, 34.

Figure 6:
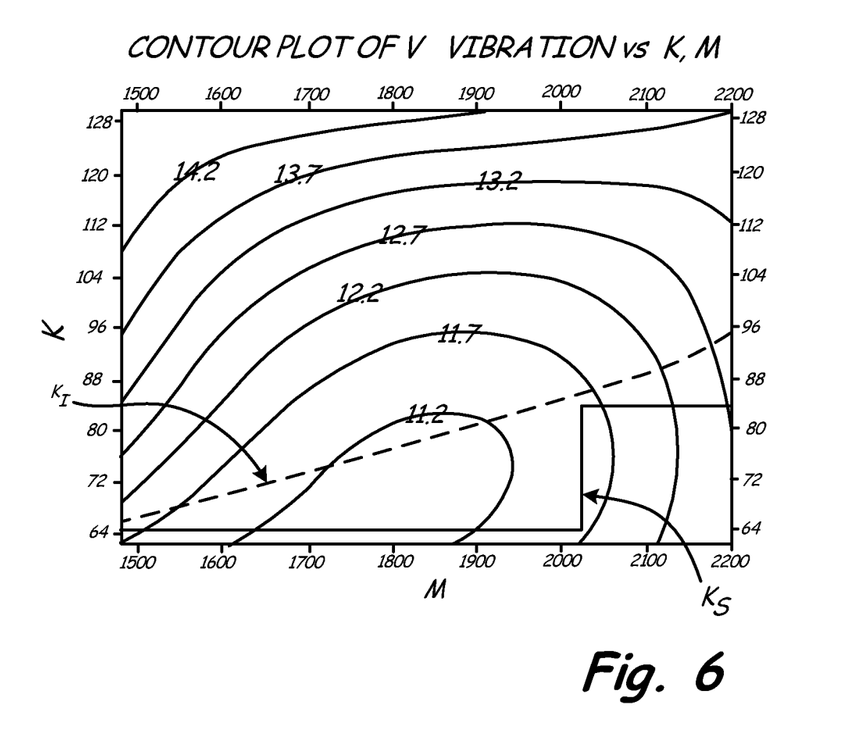
FIG. 6 is a contour plot showing vertical vibration levels as a function of damper spring stiffness and elevator car mass for a damper according to the present invention.

FIG. 6 is a contour plot showing vertical vibration levels as a function of damper spring stiffness and elevator car mass for dampers configured similarly to the damper 16 embodiment shown in FIGS. 1-5. FIG. 6 shows the results of studies performed to optimize damper performance by reducing the vertical vibration level (V) of the car. In FIG. 6, two variables, damper stiffness K (kg/mm) and car mass M (kg), are plotted as a function of vertical vibration level V (mm). The total stiffness of the damper, K, is equal to the sum of the stiffnesses of the springs under compression for a given mass of the car (M). The total mass of the car, M, also varies as the car is loaded to capacity. $K_I$ represents the ideal damper stiffness profile for a damper designed to minimize vertical vibration and car sagging for varying masses of the car (M). $K_S$ represents the stiffness profile of an embodiment of a damper configured similarly to the damper 16 in which the total stiffness varies in a stepwise fashion, instead of continuously along $K_I$. $K_S$, provides a stiffness profile approximating the ideal profile $K_I$ by employing simple and inexpensive damper configurations. Therefore, FIG. 6 shows vertical vibration levels (V) may be minimized by selecting a relatively soft spring stiffness at low car masses, for example when the car is empty, and relatively strong spring stiffnesses at high car masses, for example when the car is loaded to capacity. Although the spring stiffness at lower car masses is relatively soft, the stiffness may nevertheless be configured to minimize car sagging.

Dampers according to the present invention significantly improve vertical vibration level damping on the top of elevator cars over prior damping devices. Exemplary dampers may be configured to optimize damping capability by varying total stiffness as a function of the load of the car. By employing multiple springs, or groups of springs configured to be successively compressed with increasing stiffnesses, such dampers are configured to provide a stepwise change in total stiffness as the load on the car changes, for example from an empty car to a car loaded to capacity. This arrangement of multiple springs, or groups of springs in dampers according to the present invention is configured to provide a structure, which approximates an ideal non-linear damping profile for varying elevator car loads. Such exemplary dampers are simple and inexpensive to produce by well known manufacturing techniques and use common materials. By optimizing vertical vibration level damping on the top of elevator cars, dampers according to the present invention provide significant improvements in the overall ride quality of the cars, which, in turn, provides significant improvements in elevator system performance.

The aforementioned discussion is intended to be merely illustrative of the present invention and should not be construed as limiting the appended claims to any particular embodiment or group of embodiments. Thus, while the present invention has been described in particular detail with reference to specific exemplary embodiments thereof, it should also be appreciated that numerous modifications and changes may be made thereto without departing from the broader and intended scope of the invention as set forth in the claims that follow.

The specification and drawings are accordingly to be regarded in an illustrative manner and are not intended to limit the scope of the appended claims. In light of the foregoing disclosure of the present invention, one versed in the art would appreciate that there may be other embodiments and modifications within the scope of the present invention. Accordingly, all modifications attainable by one versed in the art from the present disclosure within the scope of the present invention are to be included as further embodiments of the present invention. The scope of the present invention is to be defined as set forth in the following claims.

The invention claimed is:

1. An elevator system comprising:
 a car assembly;
 a drive assembly; and
 a vibration-damping device arranged at a connection between a top of the car assembly and the drive assembly, including a top plate, a bottom plate, and a plurality of springs configured to provide a total spring stiffness between the top of the car assembly and the drive assembly, wherein the plurality of springs comprises:
  a first spring set comprising one or more springs each having a first end and a second end; and
  a second spring set comprising one or more springs each having a first end and a second end;
 wherein each spring in the first spring set and each spring in the second spring set are positioned between the top plate and the bottom plate, wherein the top plate and the bottom plate extend across the plurality of springs, wherein at a first car load each spring in the first spring set contacts both the top plate and the bottom plate and each spring in the second spring contacts the bottom plate and is not in contact with the top plate, and at a second car load each spring in the first spring set contacts both the top plate and the bottom plate and each spring in the second spring contacts both the top plate and the bottom plate, the second car load being greater than the first car load; and
 wherein the total spring stiffness cumulates as a mass of the car assembly increases.

2. The system of claim 1,
 wherein each spring in the first spring set has a first stiffness and a first height; and
 wherein each spring in the second spring set has a second stiffness and a second height.

3. The system of claim 2, wherein the first spring set comprises two springs each having the first stiffness and the first height.

4. The system of claim 3, wherein the second spring set comprises one spring having the second stiffness and the second height.

5. The system of claim 4,
 wherein the first height is greater than the second height; and
 wherein the second stiffness is greater than the first stiffness.

6. The system of claim 5, wherein the two springs of the first spring set are arranged on either side of the one spring of the second spring set.

7. The system of claim 6 further comprising:
 a shim arranged underneath the one spring of the second spring set.

8. The system of claim 2, wherein the first height is greater than the second height.

9. The system of claim 2, wherein the second stiffness is greater than the first stiffness.

10. The system of claim 2, wherein the second stiffness is less than or equal to the first stiffness.

11. The system of claim 1,
 wherein the car assembly comprises a car and a frame; and
 wherein the vibration-damping device is arranged at a connection between a top of the frame and the drive assembly.

12. The system of claim 11,
 wherein each spring in the first spring set has a first stiffness and a first height; and
 wherein each spring in the second spring set has a second stiffness and a second height.

13. The system of claim 12, wherein the first spring set comprises two springs each having the first stiffness and the first height.

14. The system of claim 13, wherein the second spring set comprises one spring having the second stiffness and the second height.

15. The system of claim 14,
 wherein the first height is greater than the second height; and
 wherein the second stiffness is greater than the first stiffness.

16. The system of claim 15, wherein the two springs of the first spring set are arranged on either side of the one spring of the second spring set.

17. The system of claim 16 further comprising:
 a shim arranged underneath the one spring of the second spring set.

18. The system of claim 12, wherein the first height is greater than the second height.

19. The system of claim 12, wherein the second stiffness is greater than the first stiffness.

20. The system of claim 12, wherein the second stiffness is less than or equal to the first stiffness.

21. The system of claim 1, wherein the plurality of springs are compression springs.

22. The system of claim 21, wherein the plurality of springs are generally cylindrical.

23. A vibration-damping device comprising:
a top plate;
a bottom plate;
a first spring set comprising one or more springs each having a first end and a second end, and each having a first stiffness and a first height; and
a second spring set comprising one or more springs each having a first end and a second end, and each having a second stiffness and a second height;
wherein each spring in the first spring set and each spring in the second spring set are positioned between the top plate and the bottom plate, wherein the top plate and the bottom plate extend across the plurality of springs, wherein at a first car load each spring in the first spring set contacts both the top plate and the bottom plate and each spring in the second spring contacts the bottom plate and is not in contact with the top plate, and at a second car load each spring in the first spring set contacts both the top plate and the bottom plate and each spring in the second spring contacts both the top plate and the bottom plate, the second car load being greater than the first car load; and
wherein the first and second spring sets are arranged in parallel for successive compression at a connection between a top of an elevator car assembly and a drive assembly as loads on the springs increase.

24. The device of claim 23, wherein the first spring set comprises two springs each having the first stiffness and the first height.

25. The device of claim 24, wherein the second spring set comprises one spring having the second stiffness and the second height.

26. The device of claim 25,
wherein the first height is greater than the second height; and
wherein the second stiffness is greater than the first stiffness.

27. The device of claim 26, wherein the two springs of the first spring set are arranged on either side of the one spring of the second spring set.

28. The device of claim 23,
wherein the elevator car assembly comprises a car and a frame; and
wherein the first and second spring sets are arranged at a connection between a top of the frame and the drive assembly.

29. The device of claim 28, wherein the first spring set comprises two springs each having the first stiffness and the first height.

30. The device of claim 29, wherein the second spring set comprises one spring having the second stiffness and the second height.

31. The device of claim 30,
wherein the first height is greater than the second height; and
wherein the second stiffness is greater than the first stiffness.

32. The device of claim 31, wherein the two springs of the first spring set are arranged on either side of the one spring of the second spring set.

33. The device of claim 32 further comprising:
a shim arranged underneath the one spring of the second spring set.

34. The device of claim 28, wherein the first height is greater than the second height.

35. The device of claim 28, wherein the second stiffness is greater than the first stiffness.

36. The device of claim 28, wherein the second stiffness is less than or equal to the first stiffness.

37. The device of claim 23, wherein the one or more springs of the first spring set are compression springs.

38. The device of claim 37, wherein the one or more springs of the first spring set are generally cylindrical.

39. The device of claim 23, wherein the one or more springs of the second spring set are compression springs.

40. The device of claim 39, wherein the one or more springs of the second spring set are generally cylindrical.

41. The device of claim 23, wherein the first height is greater than the second height.

42. The device of claim 23, wherein the second stiffness is greater than the first stiffness.

43. The device of claim 23, wherein the second stiffness is less than or equal to the first stiffness.

44. The device of claim 23 further comprising:
at least one shim arranged underneath the one or more springs of the second spring set.

* * * * *